(12) United States Patent
Kim et al.

(10) Patent No.: US 7,756,093 B2
(45) Date of Patent: Jul. 13, 2010

(54) METHOD FOR INFORMING THE AVAILABILITY OF RECEPTION OF TRAFFICS AND A METHOD FOR DETERMINATION OF ACTIVE OR INACTIVE STATE IN WIRELESS COMMUNICATION NETWORKS USING CONTENTION BASED DISTRIBUTED MAC

(75) Inventors: Yong-suk Kim, Daejeon (KR); Won-yong Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 848 days.

(21) Appl. No.: 11/259,135

(22) Filed: Oct. 27, 2005

(65) Prior Publication Data

US 2006/0087984 A1    Apr. 27, 2006

Related U.S. Application Data

(63) Continuation-in-part of application No. 11/116,400, filed on Apr. 28, 2005.

(60) Provisional application No. 60/565,875, filed on Apr. 28, 2004.

(30) Foreign Application Priority Data

Dec. 10, 2004    (KR) .............................. 2004-104054

(51) Int. Cl.
    *H04Q 7/24* (2006.01)
(52) U.S. Cl. ...................................... 370/338; 370/328

(58) Field of Classification Search ................. 370/345, 370/332, 458, 347, 338, 311, 468, 477, 444, 370/328; 455/41, 436, 522
See application file for complete search history.

(56) References Cited

U.S. PATENT DOCUMENTS

| 6,813,260 | B1 * | 11/2004 | Fogle ......................... 370/338 |
| 2002/0105970 | A1 * | 8/2002 | Shvodian .................... 370/468 |
| 2002/0132586 | A1 | 9/2002 | Chen et al. |
| 2002/0141375 | A1 | 10/2002 | Choi |

(Continued)

FOREIGN PATENT DOCUMENTS

KR    1020030055641 A    7/2003

OTHER PUBLICATIONS

Official Action (Korean language) issued on Feb. 26, 2007, by the Korean Intellectual Property Office for Korean Patent Application No. 2004-104054.

*Primary Examiner*—Kwang B Yao
*Assistant Examiner*—Syed Bokhari
(74) *Attorney, Agent, or Firm*—Sughrue Mion, PLLC

(57) ABSTRACT

A method for informing an availability of traffics of a wireless device configuring a wireless network. The method includes: broadcasting one of a first reception mode and a reception mode over the network. In the first reception mode, the wireless device is available or unavailable to receive the traffic depending on an information received by the wireless device during a beacon period, and in the second reception mode, the wireless device is available to receive the traffic regardless of whether the information is received.

17 Claims, 7 Drawing Sheets

U.S. PATENT DOCUMENTS

| | | |
|---|---|---|
| 2002/0163933 A1 | 11/2002 | Benveniste |
| 2003/0152041 A1 | 8/2003 | Hermann et al. |
| 2003/0174664 A1 | 9/2003 | Benveniste |
| 2004/0253954 A1* | 12/2004 | Lee et al. ............... 455/436 |
| 2005/0025081 A1* | 2/2005 | Wakamatsu ............ 370/311 |
| 2005/0122944 A1* | 6/2005 | Kwon et al. ............ 370/338 |
| 2005/0124294 A1* | 6/2005 | Wentink ................. 455/41.2 |
| 2005/0197147 A1* | 9/2005 | Stephens et al. ........ 455/522 |
| 2006/0077939 A1* | 4/2006 | Salokannel et al. ..... 370/338 |
| 2006/0198335 A1* | 9/2006 | Reunamaki et al. ..... 370/328 |
| 2007/0019666 A1* | 1/2007 | Hirano et al. ........... 370/458 |
| 2007/0165589 A1* | 7/2007 | Sakoda ................... 370/345 |

* cited by examiner

——— : DATA
- - - - - : BEACON

FIG. 2 (PRIOR ART)

| B·P | TIME SLOT 0 | TIME SLOT 1 | TIME SLOT 2 | TIME SLOT 3 | ... | TIME SLOT 255 |

FIG. 3 (PRIOR ART)

| B·P | TIME SLOT 0 | TIME SLOT 1 | TIME SLOT 2 | TIME SLOT 3 | ... |

C (SENDER NODE)

B (RECEIVER NODE)

FIG. 4

| B·P | A → B<br>TIME SLOT 0<br>SOFT<br>RESERVATION<br>SLOT | TIME SLOT 1<br>EDCA<br>SLOT | B → C<br>TIME SLOT 2<br>HARD<br>RESERVATION<br>SLOT | E → D<br>TIME SLOT 3<br>SOFT<br>RESERVATION<br>SLOT |
|---|---|---|---|---|

FIG. 5

| B·P | A → B<br>TIME SLOT 0<br>SOFT<br>RESERVATION<br>SLOT | E → F<br>TIME SLOT 1<br>HARD<br>RESERVATION<br>SLOT | G → H<br>TIME SLOT 2<br>SOFT<br>RESERVATION<br>SLOT | TIME SLOT 3<br>EDCA<br>SLOT |
|---|---|---|---|---|

METHOD FOR INFORMING THE AVAILABILITY OF RECEPTION OF TRAFFICS AND A METHOD FOR DETERMINATION OF ACTIVE OR INACTIVE STATE IN WIRELESS COMMUNICATION NETWORKS USING CONTENTION BASED DISTRIBUTED MAC

CROSS-REFERENCED TO RELATED APPLICATIONS

This application is a continuation-in-part of prior U.S. patent application Ser. No. 11/116,400, filed Apr. 28, 2005, which claims the benefit of U.S. Provisional Application No. 60/565,875, filed on Apr. 28, 2004, and Korean Patent Application No 2004-104054, filed on Dec. 10, 2004, in the Korean Intellectual Property Office, the disclosures of which are incorporated herein in their entirety.

BACKGROUND OF THE INVENTION

1. Field of the Invention

The present invention relates to a method for informing the availability of reception of traffics and a method for determination of active or inactive state in wireless devices. More particularly, the present invention relates to a method for informing the availability of reception of traffics and a method for determination of active or inactive state in wireless communication networks using contention based distributed MAC.

2. Description of the Related Art

A wireless network typically consists of a plurality of nodes. The nodes of the wireless network transmit and receive data to and from one another. The node has a regulation in order to transmit and receive data. More specifically, data experience a collision on the network when at least two nodes transmit data at the same time, and thus, a receiver node receives error-containing data. Accordingly, the nodes in the wireless network have to avoid transmitting data at the same time.

A structure of a wireless network will now be described with reference to FIG. 1. FIG. 1 illustrates a wireless network consisting of nodes A to E. The nodes A to E are located within a predetermined area of a beacon section to transmit beacons. Referring to FIG. 1, the node A transmits beacons to the nodes B to E, and the node B transmits beacons to the nodes A and C. The node C transmits beacons to the nodes A and B, and the node D transmits beacons to the nodes A and E. The node E transmits beacons to the nodes A and D. The node C transmits data to the node B during a reserved time slot, and the node E transmits data to the node D during a reserved time slot. A1

FIG. 9 represents a wireless device 10 acting as a node in the wireless network of FIG. 1. The wireless device 10 comprises a transmitter 20, a receiver 30, a controller 40, memory 50, and antenna 60. Transmitter 20, under the direction of the controller 40, transmits beacons to other nodes of the wireless network. The receiver 30, under direction of the controller 40, receives beacons and broadcast information from at least one other node of the wireless network, *and the receiver 30 provides the received beacons and information to the controller 40.

FIG. 2 illustrates a super frame used in the nodes of the wireless network. As shown in FIG. 2, the super frame consists of 256 time slots for beacons and data. The nodes in the wireless network require synchronization information to synchronize with one another. Therefore, the node transmits a beacon to its neighboring nodes with the synchronous information being contained in a certain area of the beacon. The node that wishes to transmit data uses a reserved one among the 256 time slots to transmit the data.

For example, if the node C uses the time slot 2 to transmit data, the node B receives the data during the time slot 2. If the node E uses the time slot 3 to transmit data, the node D receives the data during the time slot 3. Generally, a sender node searches for a time slot its neighboring nodes have not reserved and asks a corresponding receiver node whether it is possible to reserve the searched time slot. If it is possible to reserve the time slot in question, the receiver node notifies the sender node of that the reservation of the time slot is allowed. If it is impossible to reserve the time slot in question, the receiver node notifies the sender node of that the reservation of the time slot is canceled. If the sender node and the receiver node agree with the reservation of the time slot, the sender node transmits data to the receiver node during the reserved time slot.

FIG. 3 illustrates an active period and an inactive period of the node C for transmitting data and the node B for receiving data. FIG. 3 also illustrates a super frame consisting of a beacon transmission section and a plurality of time slots. In this example, it is assumed that the node C has reserved the time slot 0 and the time slot 1 to transmit data to the node B.

The node C enters an active state during the reserved time slot 0 and time slot 1 to transmit data to the node B. The node B enters an active state during the reserved time slot 0 and time slot 1 to receive the data from the node C. However, the node C may not transmit all of the necessary data during the time slot 0 and the time slot 1. For example, if a wireless channel condition between the nodes C and B becomes worse, the node C may not transmit the necessary data. The node C has to remain in the active state even during the time slot 2 and the time slot 3 to know if the time slot reserved by nodes other than the node C is available. If a certain node reserves the time slot 2 and the time slot 3 but does not use the time slot 2 and the time slot 3, the node C transmits data during the time slot 2 and the time slot 3. The node B remains in the active state during the reserved time slot 0 and time slot 1, and returns to inactive state during the time slot 2 and the time slot 3. Accordingly, the node B can prevent unnecessary power consumption.

However, if a power of the node C is less than a predetermined set value, the node C wastes the power because the node C remains in the active state during the time slot 2 and the time slot 3 regardless of the state of the node B. Also, when the sender node C remains in the active state to transmit data although the receiver node B is in the inactive state, unnecessary power consumption is caused by the sender node C. Also, since another nodes wish to use the time slots 2 and 3 but they are not allowed to use the time slots 2 and 3, a wireless resource is wasted.

SUMMARY OF THE INVENTION

The present invention has been developed in order to solve the above problems in the related art. Accordingly, it is an aspect of the present invention to provide a method for informing the availability of reception of traffics and a method for determination of active or inactive state in wireless communication networks using a contention based distributed MAC.

It is another aspect of the present invention to provide a method for informing a reception mode of PCA traffic of a wireless device that configures a wireless network and uses a prioritized contention access (PCA) and a method for transmitting a PCA traffic to another wireless device with reference to the reception mode of PCA traffic of another wireless device.

It is still another aspect of the present invention to provide a method and system in which a sender node reserves a time slot to enable a receiver node to receive multicast data without an error.

It is still another aspect of the present invention to provide a method and system in which a sender node is capable of using a time slot excluding its reserved time slot to transmit data, thereby improving data transmission efficiency.

The above aspects are achieved by providing a method for informing a reception mode of prioritized contention access (PCA) traffics of a wireless device of a wireless network. The method includes the wireless device determining one of a first reception mode and a second reception mode, in the first reception mode the wireless device being available or unavailable depending on an information received by the wireless device during a beacon period, in the second reception mode the wireless device being available to receive the PCA traffic regardless of whether the information is received during the beacon period, and the wireless device broadcasting a reception mode information about the determined reception mode over the network.

Preferably, but not necessarily, in the first reception mode, the wireless device is available to receive the PCA traffic if the information includes an information indicating that 'another wireless device of the wireless network has a PCA traffic to transmit to the wireless device.

Preferably, but not necessarily, the information received by the wireless device during the beacon period includes a traffic indication map information element (TIM IE), and the information indicating that 'another wireless device has a PCA traffic to transmit to the wireless device' is recorded to the TIM IE.

Preferably, but not necessarily, the information indicating that 'another wireless device has a PCA traffic to transmit to the wireless device' includes an address information about another wireless device which is a transmitter of the PCA traffic and an address information about the wireless device which is a receiver of the PCA traffic.

Preferably, but not necessarily, in the second reception mode, the wireless device is available to receive the PCA traffic regardless of the information recorded to the TIM IE.

Preferably, but not necessarily, in the first reception mode, if the information received by the wireless device during the beacon period includes the information indicating that 'another wireless device has a PCA traffic to transmit to the wireless device', the wireless device maintains an active state during a PCA slot in which another device is to transmit the PCA traffic to be available to receive the PCA traffic, and if the information received by the wireless device during the beacon period does not include the information indicating that 'another wireless device has a PCA traffic to transmit to the wireless device', the wireless device maintains an inactive state during the PCA slot.

Preferably, but not necessarily, the broadcasting step includes the wireless device recording the reception mode information to an information element, i.e., a PCA availability IE that indicates a medium access slot (MAS) during which the wireless devices of the wireless network are available to receive the PCA traffic, and the wireless device broadcasting the PCA availability IE including the reception mode information over the network.

Preferably, but not necessarily, the reception mode information is recorded to an interpretation field provided in the PCA availability IE.

Preferably, but not necessarily, the interpretation field is 1 byte long, and the reception mode information is recorded to a TIM IE required bit provided in the interpretation field.

Preferably, but not necessarily, if the TIM IE required bit is '1', the wireless device is in the first reception mode, and if the TIM IE required bit is '0', the wireless device is in the second reception mode.

Preferably, but not necessarily, the determining step determines one of the first reception mode and the second reception mode based on at least one of a power level usable by the wireless device, an amount of traffic to be transmitted, an amount of traffic to be received, a transmission frequency and a reception frequency.

Preferably, but not necessarily, the method further includes another wireless device receiving the reception mode information of the wireless device broadcasted by the wireless device, and if the received reception mode information indicates the first reception mode and another wireless device has a PCA traffic to transmit to the wireless device, another wireless device broadcasting the information indicating that 'another wireless device has a PCA traffic to transmit to the wireless device' before transmitting the PCA traffic.

The above aspects are achieved by providing a method for informing a reception mode of prioritized contention access (PCA) traffics of a wireless device of a wireless network, the method comprising: the wireless device determining one of a first reception mode and a second reception mode and broadcasting a reception mode information indicating whether the wireless device is in the first reception mode or the second reception mode over the wireless network, in the first reception mode the wireless device being available or unavailable to receive the PCA traffic depending on an information received by the wireless device during a beacon period, in the second reception mode, the wireless device being available to receive the PCA traffic regardless of whether the information is received.

The above aspects are also achieved by providing a method for informing an availability of reception of traffics of a wireless device which configures a wireless network using a contention-based distributed medium access control. The method includes the wireless device determining one of a first reception mode and a second reception mode, in the first reception mode the wireless device being available on unavailable depending on an information received by the wireless device during a beacon period, in the second reception mode the wireless device being available to receive the traffics regardless of whether the information is received during the beacon period, and the wireless device broadcasting a reception mode information about the determined reception mode over the wireless network.

Preferably, but not necessary, the method further includes the wireless device referring to at least one of the determined reception mode and the information received by the wireless device during the beacon period and maintaining one of an active state and an inactive state during specific slots.

The above aspects are also achieved by providing a method for informing an availability of reception of traffics of a wireless device which configures a wireless network. The method includes the wireless device broadcasting one of a first reception mode and a second reception mode over the network, in the first reception mode the wireless device being available or unavailable to receive the traffic depending on an information received by the wireless device during a beacon period, in the second reception mode, the wireless device being available to receive the traffic regardless of whether the information is received during the beacon period.

Preferably, but not necessarily, the wireless network uses a contention-based distributed medium access control.

The above aspects are achieved by providing a method for determining a state of a first node in a wireless network consisting of a plurality of nodes. The method comprises determining one of at least two power sensitivity levels by considering at least one of an available power and a standby packet, and determining whether the first node remains in active state or inactive state by considering a power sensitivity level transmitted from at least one second node which corresponds to the first node and the determined power sensitivity level.

Preferably, but not necessarily, the state of the first node is identical to a state of the second node.

Preferably, but not necessarily, the power sensitivity level consists of 2 bits, and is added to a beacon to be transmitted to the second node.

Preferably, but not necessarily, the first node determines the state of the first node by considering a lower one of the transmitted power sensitivity level and the determined power sensitivity level as a lower power sensitivity level.

Preferably, but not necessarily, a state of a time slot comprises one of a time slot reserved by the first or the second node, a soft reservation slot reserved by a node other than the first or the second node, a hard reservation slot reserved by the node other than the first or the second node, and a non-reserved time slot.

Preferably, but not necessarily, the first node remains in the active state during the time slot reserved by the first node without considering the determined power sensitivity level.

Preferably, but not necessarily, the first node determines whether the first node remains in the active state or the inactive state by considering the state of the time slot.

Preferably, but not necessarily, the power sensitivity level comprises one of four power sensitivity levels 1, 2, 3, and 4, the four sensitivity levels increasing with power sensitivity level number, and if the lower power sensitivity level is 1 and a broadcast data or an asynchronous data is generated, the first node remains in the active state during the non-reserved time slot.

Preferably, but not necessarily, the power sensitivity level comprises one of four power sensitivity levels 1, 2, 3, and 4, the four sensitivity levels increasing with power sensitivity level number, and if the lower power sensitivity level is 2, the first node remains in the active state during the non-reserved time slot.

Preferably, but not necessarily, the power sensitivity level comprises one of four power sensitivity levels 1, 2, 3, and 4, the four sensitivity levels increasing with power sensitivity level number, and if the lower power sensitivity level is 3, the first node remains in the active state during a time slot excluding the hard reservation time slot that is reserved by a node other than the first node or the second node.

Preferably, but not necessarily, the power sensitivity level comprises one of four power sensitivity levels 1, 2, 3, and 4, the four sensitivity levels increasing with power sensitivity level number, and if the lower power sensitivity level is 4, the first node remains in the active state during all of the time slots.

Also, the above aspect is achieved by providing a system for determining a state of a first node in a wireless network consisting of a plurality of nodes. The system comprises a first node determining one of at least two power sensitivity levels by considering at least one of an available power and a standby packet, the first node determining whether the first node remains in an active state or an inactive state by considering a power sensitivity level transmitted from at least one second node which corresponds to the first node and the determined power sensitivity level, and the second node having an identical state to the first node.

BRIEF DESCRIPTION OF THE DRAWINGS

FIG. 2 is a view illustrating a structure of a super frame used by the node in the wireless network;

FIG. 3 is a view illustrating one example of unnecessary power consumption at the node of the conventional wireless network;

FIG. 4 is a view illustrating a power-saving method of a node of a wireless network according to an embodiment of the present invention;

FIG. 5 is a view illustrating a power-saving method of a node of a wireless network according to an embodiment of the present invention;

DETAILED DESCRIPTION OF AN EXEMPLARY EMBODIMENT

Figure 1:
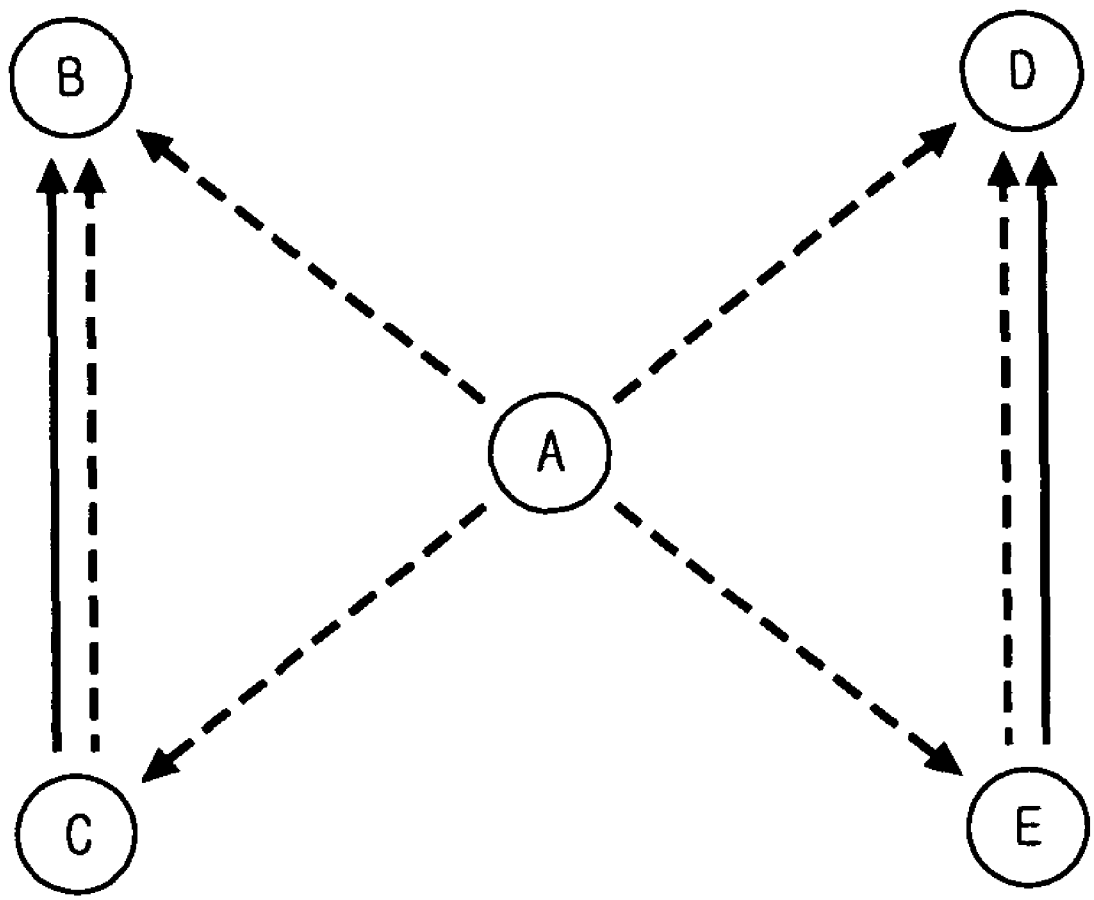
FIG. 1 is a view illustrating a wireless network consisting of a plurality of nodes.

Hereinafter, the preset invention will now be described in greater detail with reference to the accompanying drawings.

The present invention suggests a power sensitivity level concept. The power sensitivity level is determined by considering a power remaining in a node and a standby packet. A node determines whether it remains in an active state or an inactive state according to the power sensitivity level. In this embodiment, the number of the power sensitivity levels is set to four (4). However, this should not be considered as limiting. The number of the power sensitivity levels can be determined according to a user's setting. The power sensitivity levels may be set as many as possible so that the power sensitivity can be measured more precisely. Each node measures its power sensitivity level. The power sensitivity level can be expressed by 2 bits because the number of the power sensitivity levels is set to 4. If the number of the power sensitivity levels exceeds 4, the number of bits for expressing the power sensitivity level increases. The following table 1 shows the power sensitivity level.

TABLE 1

| Power Sensitivity Level | Bit |
| --- | --- |
| Level 1 | 00 |
| Level 2 | 01 |
| Level 3 | 10 |
| Level 4 | 11 |

Hereinafter, a method for determining a state of a node in a wireless network without considering neighboring nodes will now be described.

A node 1 having the power sensitivity level 1 remains in an active state during its reserved time slot. That is, the node 1 remains in an active state during its reserved time slot to transmit and receive data. Also, the node 1 remains in an active state during an EDCA (Enhanced Distributed Channel Access) slot or a non-reserved time slot if it is necessary for the node 1 to receive or transmit broadcast data or asynchronous data. The respective nodes perform the same operation during the EDCA slot and the non-reserved slot. The EDCA slot is a channel access slot based on competition. That is, the EDCA slot determines a priority according to the kind of data to be transmitted to a node which has requested for reservation. For example, the EDCA slot assigns a high priority to the broadcast data or the asynchronous data and assigns a low priority to unicast data.

A node 2 having the power sensitivity level 2 remains in an active state during its reserved time slot. Also, the node 2 having the power sensitivity level 2 remains in an active state during the EDCA slot.

A node 3 having the power sensitivity level 3 remains in an active state during its reserved time slot. Also, the node 3 having the power sensitivity level 3 remains in an active state during the EDCA slot and a soft reservation slot which is reserved by a node other than the node 3. A reservation slot is divided into a soft reservation slot and a hard reservation slot. The soft reservation slot is a slot that can be used by a node which does not reserve the slot without transferring any message. The hard reservation slot transmits a message when a node reserves a slot but does not use the slot, so that the hard reservation slot can be used by a node that does not reserve the slot.

A node 4 having the power sensitivity level 4 remains in an active state during its reserved time slot. The node 4 having the power sensitivity level 4 remains in an active state during the EDCA slot, and the soft reservation slot and the hard reservation slot of a node other than the node 4.

Each node transmits to its neighboring nodes a beacon that contains information on the power sensitivity level thereof within a beacon transmission section. Accordingly, each node of the wireless network can perceive the power sensitivity level of its neighboring node in addition to the power sensitivity level thereof.

Hereinafter, a method for determining a state of a node in a wireless network by considering a power sensitivity level of a corresponding node will now be described. If the node is for transmitting data, the corresponding node is for receiving the data. If the node is for receiving data, the corresponding node is for transmitting the data. The node remains in an active state during its reserved time slot regardless of the power sensitivity level.

A node 1 having the power sensitivity level 1 remains in an active state if it is necessary for the node 1 to transmit and receive broadcast data or asynchronous data. Otherwise, the node 1 remains in an inactive state.

A node 2 having the power sensitivity 2 determines whether it remains in an active state or an inactive state according to the power sensitivity level of its corresponding node during the EDCA slot. That is, if a corresponding node has a power sensitivity level 1 during the EDCA slot and if broadcast data or asynchronous data is not generated, the node 2 remains in an inactive state, and otherwise, the node 2 remains in an active state. Also, the node 2 having the power sensitivity level 2 remains in an inactive state during the soft reservation slot and the hard slot reservation slot which are reserved by a node other than the node 2 and the corresponding node regardless of the power sensitivity level of the corresponding node.

A node 3 having the power sensitivity level 3 determines whether it remains in an active state or an inactive state according to the power sensitivity level of its corresponding node during the EDCA slot. That is, if the corresponding node has a power sensitivity level 1 during the EDCA slot and if broadcast data or asynchronous data is not generated, the node 3 remains in an inactive state, and otherwise, the node 3 remains in an active state. Also, if the corresponding node has a power sensitivity level 1 or 2, the node 3 having the power sensitivity level of 3 remains in an inactive state during the soft reservation slot reserved by a node other than the node 3 and corresponding node, and otherwise, the node 3 remains in an active state. The node 3 having the power sensitivity level 3 remains in an inactive state during the hard reservation slot reserved by a node other than the node 3 regardless of the power sensitivity level of the corresponding node.

A node 4 having the power sensitivity level 4 determines whether it remains in an active state or an inactive state according to the power sensitivity level of its corresponding node during the EDCA slot. That is, if the corresponding node has a power sensitivity level 1 during the EDCA slot and if broadcast data or asynchronous data is not generated, the node 4 remains in an inactive state, and otherwise, the node 4 remains in an active state. Also, if the corresponding node has the power sensitivity level 1 or 2 during the soft reservation slot reserved by a node other than the node 4, the node 4 having the power sensitivity level 4 remains in an inactive state, and otherwise, the node 4 remains in an active state. If the corresponding node has the power sensitivity level of 1, 2, or 3 during the hard reservation slot reserved by a node other than the node 4, the node 4 having the power sensitivity level of 4 remains in an inactive state, and otherwise, the node 4 remains in an active state.

Hereinafter, a method of switching between an active state and an inactive state in a wireless network to solve a power-consumption problem in the related art will now be described.

FIG. 4 illustrates a network consisting of nodes A to E by way of an example. The node A has a power sensitivity level 1, the nodes B and C have a power sensitivity level 2, and the nodes D and E have a power sensitivity level 3. The node A reserves a time slot 0 in order to transmit data to the node B, and the node B reserves a time slot 2 in order to transmit data to the node C. The node E reserves a time slot 3 in order to transmit data to the node D. Also, it is assumed that the node C does not reserve any time slot for the data transmission but asynchronous data to be transmitted to the node E is generated. The following table 2 shows active/inactive states of the respective nodes according to the time slots 0 to 3.

TABLE 2

| | Time Slot 0 | Time Slot 1 | Time Slot 2 | Time Slot 3 |
|---|---|---|---|---|
| Node A (Power sensitivity level 1) | Active | Inactive | Inactive | Inactive |
| Node B (Power sensitivity level 2) | Active | Active | Active | Inactive |
| Node C (Power sensitivity level 2) | Inactive | Active | Active | Inactive |
| Node D (Power sensitivity level 3) | Active | Active | Inactive | Active |
| Node E (Power sensitivity level 3) | Active | Active | Inactive | Active |

As shown in table 2, the node A and the node B remain in an active state during their reserved time slot 0. However, since the node A has the power sensitivity level 1, the nodes A and B remain in an inactive state during a hard reservation slot (time slot 2) and a soft reservation slot (time slot 3) which are reserved by a node other than nodes A and B. The nodes A and B remain in an inactive state during the EDCA slot (time slot 1) since broadcast data or asynchronous data is not generated.

The nodes B and C remain in an active state during their reserved time slot 2. The nodes B and C remain in an active state during the time slot 1 because they have the power sensitivity level 2. The nodes B and C remain in an inactive state during the soft reservation slot reserved by a node other than nodes B and C (time slot 0 and time slot 3).

The nodes D and E remain in an active state during their reserved time slot 3. Since the node D and the node E have the power sensitivity level 3, they remain in an active state during the time slot 1 and the time slot 3. The nodes D and E remain in an inactive state during the hard reservation slot reserved by a node other than the nodes D and E (time slot 2).

Since the node C has the power sensitivity level 2 and the node E has the power sensitivity level 3, the nodes C and E determine whether they remain in an active state or an inactive state by using the node C which is lower than the node E in the power sensitivity level. Accordingly, the nodes C and E remain in an active state during the time slot 1 and remain in an inactive state during the time slot 0, the time slot 2 and the time slot 3.

If one certain node can remain both in an active state and an inactive state during a specific time slot, the node remains in an active state in an exemplary embodiment.

FIG. 5 illustrates a wireless network consisting of nodes A to H. The node A has a power sensitivity level 1, and the nodes B and C have a power sensitivity level 2. The nodes D, E and G have a power sensitivity level 3, and the nodes F and H have a power sensitivity level 4. The node A reserves a time slot 0 in order to transmit data to the node B, and the node E reserves a time slot 1 in order to transmit data to the node F. The node G reserves a time slot 2 in order to transmit data to the node H. Also, it is assumed that the node C does not reserve any time slot for data transmission but asynchronous data to be transmitted to the node D is generated. The following table 3 shows active/inactive states of the respective nodes according to the time slots 0 to 3.

TABLE 3

| | Time Slot 0 | Time Slot 1 | Time Slot 2 | Time Slot 3 |
|---|---|---|---|---|
| Node A (Power Sensitivity level 1) | Active | Inactive | Inactive | Inactive |
| Node B (Power Sensitivity level 2) | Active | Inactive | Inactive | Inactive |
| Node C (Power Sensitivity level 2) | Inactive | Inactive | Inactive | Active |
| Node D (Power Sensitivity level 3) | Inactive | Inactive | Inactive | Active |
| Node E (Power Sensitivity level 3) | Active | Active | Active | Active |
| Node F (Power Sensitivity level 4) | Active | Active | Active | Active |
| Node G (Power Sensitivity level 3) | Active | Inactive | Active | Active |
| Node H (Power Sensitivity level 4) | Active | Inactive | Active | Active |

Referring to table 3, the nodes A and B remain in an active state during their reserved time slot 0. However, since the node A has the power sensitivity level 1, the nodes A and B remain in an inactive state during a hard reservation slot (time slot 1) and a soft reservation slot (time slot 2) which are reserved by a node other than the nodes A and B. The nodes A and B remains in an inactive state during the time slot 3 which is an EDCA slot because broadcast data or asynchronous data is not generated The nodes E and F remain in an active state during their reserved time slot 1. Since the node E has the power sensitivity level 3, the nodes E and F remain in an active state during the soft reservation slot (time slot 0 and time slot 2) which are reserved by a node other than the nodes E and F and the EDCA slot (time slot 3).

The nodes G and H remain in an active state during their reserved time slot 2. Since the node G has the power sensitivity level 3, the nodes G and H remains in an active state during the soft reservation time slot (time slot 0) reserved by a node other than the nodes G and H and the EDCA slot (time slot 3), and remain in an inactive state during the hard reservation slot (time slot 1) reserved by a node other than the nodes G and H.

Since the node C has the power sensitivity level 2 and the node D has the power sensitivity level 3, the nodes C and D determine whether they remains in an active state or an inactive state by using the node C that is lower in the power sensitivity level than the node D. Accordingly, the nodes C and D remain in an active state during the time slot 3 and remains in an inactive state during the time slot 0, time slot 1 and the time slot 2.

The nodes A to H each transmit data during its reserved time slot. If a certain node reserves a time slot but does not use the reserved time slot, the time slot is available to other nodes. For example, if the nodes A and B do not use the time slot 0, the time slot 0 is available to the node E, the node F, the node G, and the node H.

Hereinbelow, another embodiment of the present invention will now be described.

According to another embodiment of the present invention, a wireless device of a wireless network determines a reception mode of traffics or availability of reception of traffics, and informs the wireless network of the determined reception mode of traffics or availability of reception of traffics.

This embodiment is applicable to a wireless network using a contention-based distributed medium access control by way of example. Of course, this embodiment is applicable to any other wireless network.

This embodiment is applicable to prioritized contention access (PCA) traffics by way of example. Of course, this embodiment is applicable to any other traffics.

The PCA traffic is transmitted and received during PCA slots of medium access slots (MASs) configuring a super frame of the wireless network. Herein, the MAS has the substantially same concept as the time slot described above.

A PCA slot accesses a wireless medium based on a prioritized contention, which is differentiated from a distributed reservation protocol (DRP) slot that is previously reserved by a specific wireless device to be able to access a wireless medium. If an MAS for the super frame is not the DRP slot except, it is the PCA slot. That is, the MAS for the super frame is either the DRP slot or the PCA slot. It can be appreciated that the PCA slot is the same as the above-described enhanced distributed channel access (EDCA) slot.

According to another embodiment of the present invention, a reception mode of PCA traffic of the wireless device is classified to two reception modes. One reception mode is that the wireless device is available or unavailable to receive the PCA traffic depending on the information received by the wireless device during the beacon period, which is referred to as a 'first reception mode' hereinbelow. The other reception mode is that the wireless device is always available to receive the PCA traffic regardless of whether the information is received during the beacon period, which is referred to as a 'second reception mode' hereinbelow.

The wireless device operating in the first reception mode will be described in detail below.

The wireless device operating in the first reception mode (referred to as a 'first wireless device') becomes available to receive the PCA traffic if another wireless device has a PCA traffic to transmit to the wireless device, i.e., if there is another wireless device to transmit a PCA traffic to the wireless device.

If the first wireless device is available to receive the PCA traffic, the first wireless device maintains an active state during the PCA slot in which another device is to transmit the PCA traffic.

Whether another wireless device has the PCA traffic to transmit to the first wireless device, i.e., whether there exists another wireless device to transmit the PCA traffic to the wireless device, is determined with reference to the information received by the first wireless during the beacon period.

That is, if the information received during the beacon period indicates that another wireless device has the PCA traffic to transmit to the first wireless device, i.e., that there exists another wireless device to transmit the PCA traffic to the first wireless device, the first wireless device notes the fact based on the information.

The information received during the beacon period and referred by the first wireless device may be a traffic indication map information element (TIM IE). That is, the TIM IE, which is transceived during the beacon period in the wireless network, may contain the information indicating that another wireless device has the PCA traffic to transmit to the first wireless device, i.e., that there exists another wireless device to transmit the PCA traffic to the first wireless device.

Also, the information indicating that another wireless device has the PCA traffic to transmit to the first wireless device, i.e., that there exists another wireless device to transmit a PCA traffic to the first wireless device may be address information about another wireless device which is to transmit the PCA traffic and address information about the first wireless device which is to receive the PCA traffic.

Meanwhile, the first wireless device becomes unavailable to receive the PCA traffic if another wireless device has no PCA traffic to transmit to the first wireless device i.e. if there is no wireless device to transmit the PCA traffic to the first wireless device.

That is, if the information received during the beacon period, such as TIM IE, does not indicate that another wireless device has the PCA traffic to transmit to the first wireless device, i.e., that there is another wireless device to transmit the PCA traffic to the first wireless device, the first wireless device becomes unavailable to receive the PCA traffic.

If the first wireless device becomes unavailable to receive the PCA traffic, the first wireless device maintains an inactive state during the PCA slot configuring the super frame.

Meanwhile, if the first wireless device has a PCA traffic to transmit to another wireless device, the first wireless device maintains an active state during the PCA slot. Also, the first wireless device maintains an active state during a DRP slot in which the first wireless device is reserved as a transmitter or receiver.

As described above, the first wireless device operating in the first reception mode does not always maintain an active state during the PCA slot configuring the super frame. More specifically, if there exists another wireless device to transmit the PCA traffic to the first wireless device, the first wireless device maintains an active state during the PCA slot, and otherwise, the first wireless device maintains an inactive state during the PCA slot. Therefore, unnecessary power consumption can be prevented.

Also, if a small level of power is usable by the wireless device, e.g., if a power usable by the wireless devices is less than a predetermined threshold, the wireless device operates in the first reception mode and thus can reduce a power consumption. Also, if an amount of traffic to be transmitted or received by the wireless device, a transmission frequency, and a reception frequency has a relatively small value, the wireless device operates in the first reception mode and thus prevents unnecessary power consumption.

A wireless device operating in the second reception mode will be described in detail.

The wireless device operating in the second reception mode (referred to as a 'second wireless device' below) is available to receive a PCA traffic regardless of whether the TIM IE is received during the beacon period.

The second wireless device may be available to receive a PCA traffic regardless of the information recorded to the TIM IE.

Meanwhile, the second wireless device maintains an active state during the DRP slot in which the second wireless device is reserved as a transmitter or receiver.

If a wireless device has a high level of power, or a large amount of traffic, a high transmission frequency or a high reception frequency, the wireless device operates in the second reception mode.

The wireless device can be switched between the two reception modes. If the wireless device lacks a power in the second reception mode, it is switched to the first reception mode. In switching, the wireless device may take the amount of traffic to be transmitted, the amount of traffic to be received, the transmission frequency and the reception frequency into account.

The wireless device broadcasts information about its determined reception mode over the wireless network to inform another wireless device of its reception mode, i.e., of whether the wireless device is in the first reception mode or the second reception mode.

More specifically, the wireless device records the reception mode information to the PCA availability IE and broadcasts it.

The PCA availability IE is an information element representing MASs during which the wireless devices of the wireless network are capable of receiving the PCA traffic, i.e., representing the PCA slots among the MASs configuring the super frame.

Figure 6:
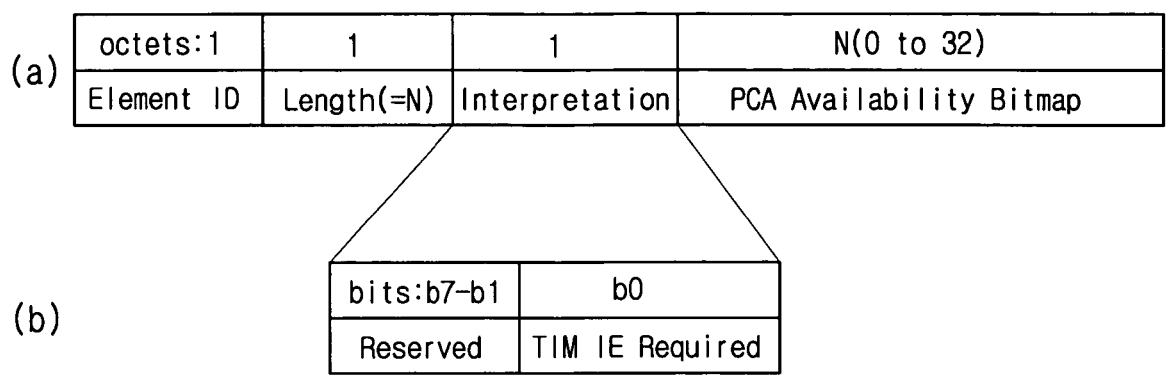
FIG. 6 is a view illustrating a PCA availability IE format and an interpretation field format.

As shown in (a) of FIG. 6, the PCA Availability IE consists of an 'element ID' field which is 1 byte long, a 'PCA Availability bitmap' field which contains information about the MASs designated as PCA slots and is N byte long (N=0~32), a 'length field' which contains information about a length of the PCA availability bitmap and is 1 byte long, and an 'interpretation' field which is 1 byte long. The above-described reception mode information is recorded to the 'interpretation' field.

More specifically, as shown in (b) FIG. 6, the 'interpretation' field is provided with a TIM IE Required bit b0 and the TIM IE Required bit b0 indicates the above-described reception mode information.

If the TIM IE Required bit is '1', the wireless device operates in the first reception mode, and if the TIM IE Required bit is '0', the wireless device operates in the second reception mode.

Since the first wireless device operating in the first reception mode requires the TIM IE to determine whether to maintain an active state or an inactive state during the PCA slot, a bit representing the reception mode information is called "TIM Required bit" (b0).

The wireless device of the wireless network receives the reception mode information from another wireless device and thus refers to it in transmitting the PCA traffic.

More specifically, when a wires device B to receive a PCA traffic operates in the first reception mode, a wireless device A to transmit the PCA traffic records information indicating that the wireless device A has a PCA traffic to transmit to the wireless device B to a TIM IE and broadcasts or transmits the TIM IE during the beacon period before transmitting the PCA traffic. Then, the wireless device B determines to be maintained in an active state during the PCA slot with reference to the TIM IE.

On the other hand, when the wireless device B operates in the second reception mode, the wireless device A may omit the procedure of broadcasting or transmitting the TIM IE because the wireless A is always in an active state during the PCA slot.

Up to now, the method for informing another wireless device of the reception mode of PCA traffic determined by the wireless device is described. Also, the method for transmitting the PCA traffic to another wireless device by referring to the reception mode of PCA traffic is described.

Brief descriptions of the above-described methods will be made with reference to FIG. 7.

First, the method in which a wireless device informs another wireless device of its reception mode of PCA traffic determined by the wireless device will be described in detail (operation S100).

Figure 7:
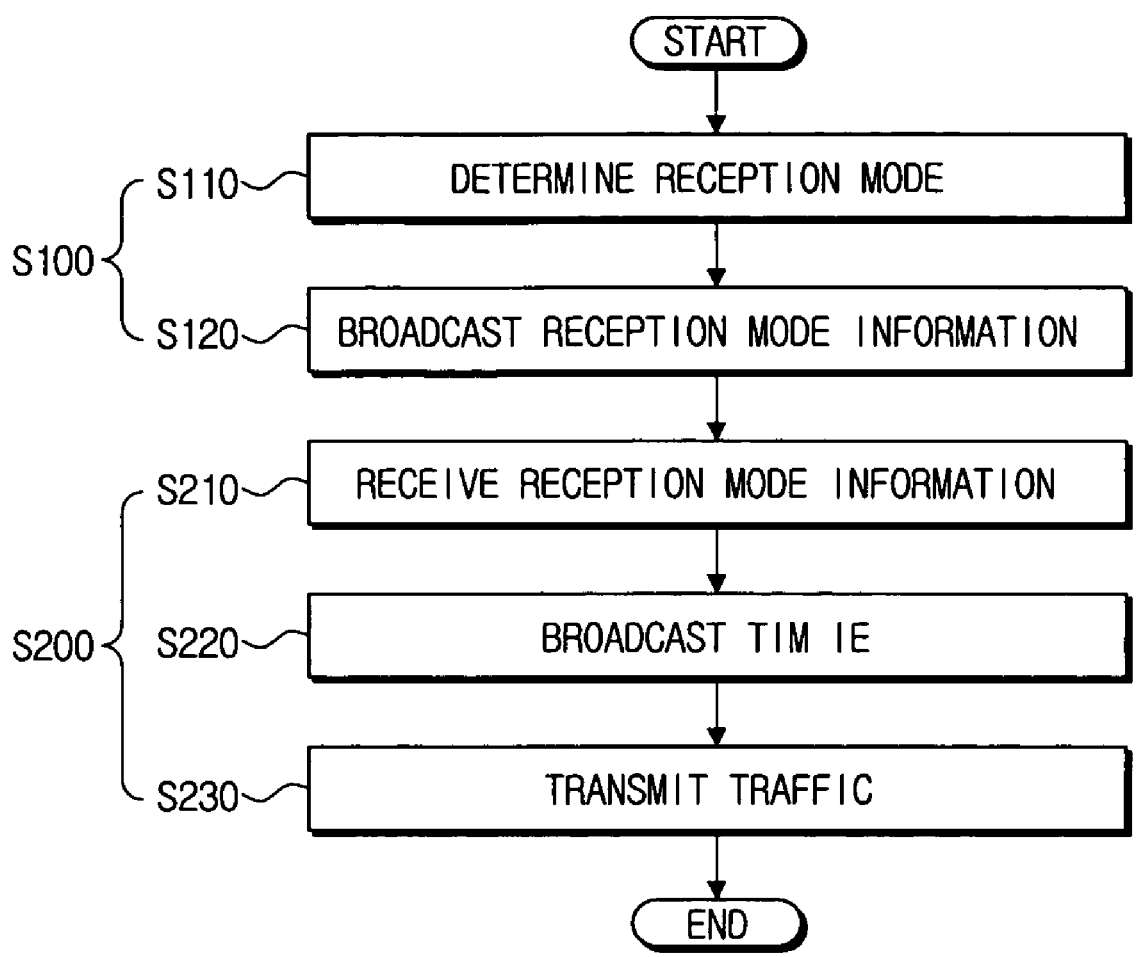
FIG. 7 is a flowchart illustrating a method for informing a reception mode of PCA traffic and a method for transmitting a PCA traffic with reference to the reception mode.

Referring to FIG. 7, a wireless device determines a first reception mode or a second reception at operation S110. In the first reception mode, whether the wireless device is available or unavailable to receive the PCA traffic depends on the information recorded in the TIM IE received by the wireless device during the beacon period, and in the second reception mode, the wireless device is available to receive the PCA traffic regardless of whether the TIM IE is received by the wireless device during the beacon period.

More specifically, in the first reception mode, if the TIM IE contains the information indicating that another wireless device has a PCA traffic to transmit to the wireless device, i.e., indicating that there exists another wireless device to transmit the PCA traffic to the wireless device, the wireless device becomes available to receive the PCA traffic, and otherwise, the wireless device becomes unavailable to receive the PCA traffic.

At operation S110, the wireless device takes a power usable by the wireless device, an amount of traffic to be transmitted, an amount of traffic to be received, a transmission frequency and a reception frequency into account.

The wireless device broadcasts reception mode information indicating whether it is in the first reception mode or the second reception mode, which is determined at operation S110, over the wireless network at operation S120.

More specifically, at operation S120, the wireless device records the reception mode information to the TIM IE Required bit b0 provided in the interpretation field of the PCA availability IE as shown in FIG. 6, and broadcasts the PCA availability IE over the network.

Herein, if the TIM IE required bit is '1', the reception mode information indicates that the wireless device is in the first reception mode, and if the TIM IE required bit is '0', the reception mode information indicates that the wireless device is in the second reception mode.

Hereinbelow, the method in which the wireless device transmits the PCA traffic to another wireless device with reference to the reception mode of PCA traffic of another wireless device (operation S200) will be described.

At operation S210, a wireless device of a wireless network receives reception mode information of another wireless devices broadcasted at operation 120. Accordingly, the wireless device is aware of the reception mode of another wireless device and thus refers to it in transmitting the PCA traffic.

More specifically, if a wireless device B to receive the PCA traffic is in the first reception mode, a wireless device A to transmit the PCA traffic records information indicating 'the wireless device A has a PCA traffic to transmit to the wireless device B' to the TIM IE and broadcasts or transmits the TIM IE during the beacon period before transmitting the PCA traffic to the wireless device B at operation S220. Then, the wireless device B refers to the TIM IE and determines that the wireless device maintains an active state during the PCA slot.

If the wireless device to receive the PCA traffic is in the second reception mode, the wireless device A to transmit the PCA traffic may omit the procedure of broadcasting or transmitting the TIM IE because the wireless B is always in an active state during the PCA slot.

The wireless device transmits a traffic to another wireless device during a corresponding slot at operation S230. Herein, the corresponding slot can be both the DRP slot and the PCA slot.

Additional description of the present invention will now be made with reference to FIG. 8.

Figure 8:
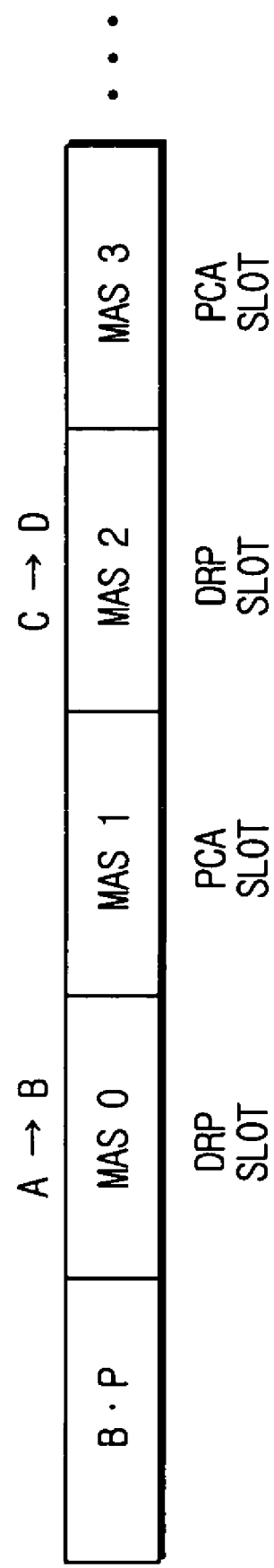
FIG. 8 is a view illustrating one example case adopting the method for informing a reception mode of PCA traffic and the method for transmitting a PCA traffic with reference to the reception mode of PCA traffic.
Figure 9:
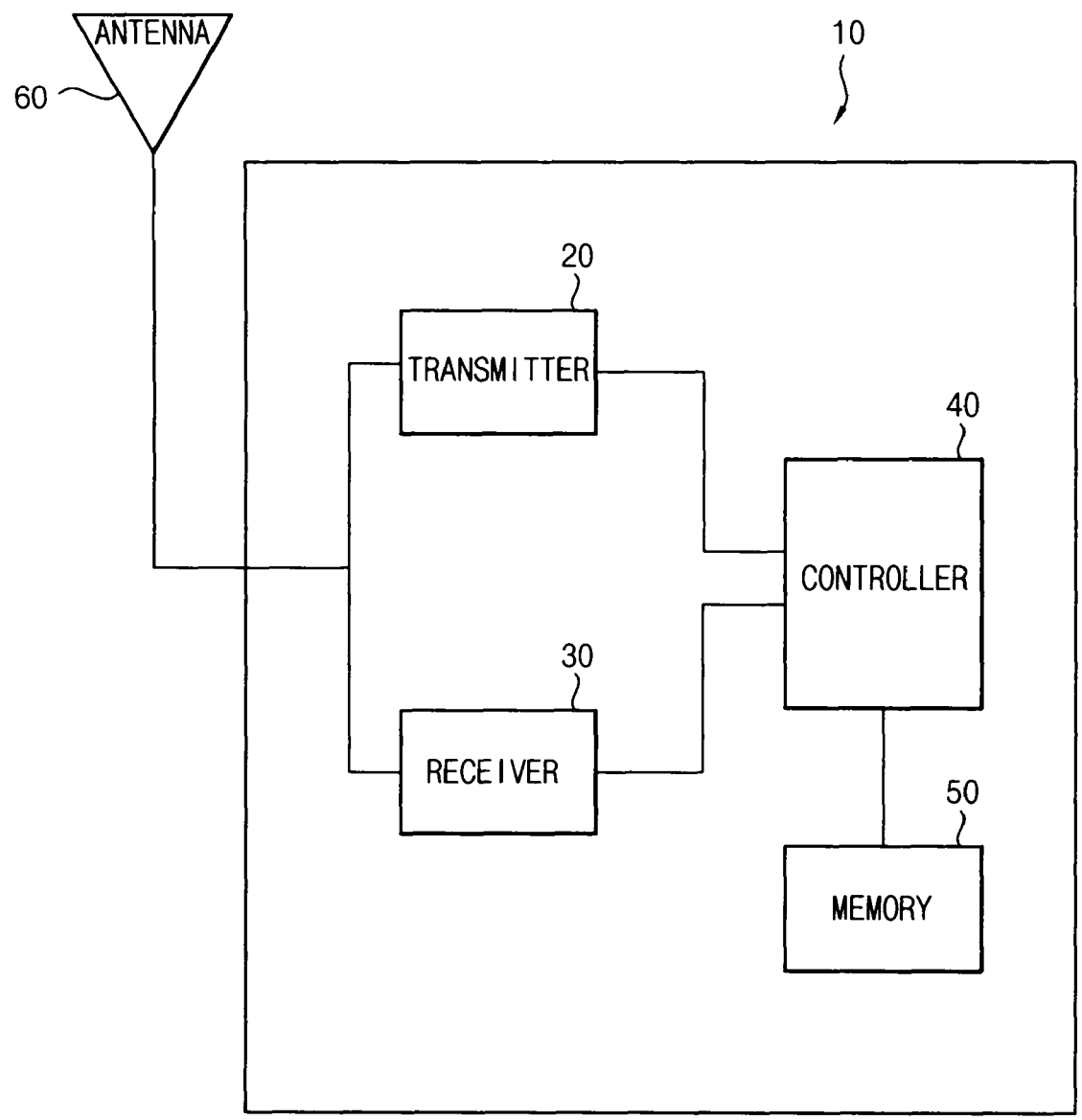
FIG. 9 is a view illustrating a wireless device acting as a node in the wireless network of FIG. 1.

FIG. 8 illustrates a part of the super frame used in a wireless network consisting of a wireless device A, a wireless device B, a wireless device C and a wireless device D, i.e., illustrating a beacon period (BP), MAS 0, MAS 1, MAS 2, and MAS 3.

It is assumed that the wireless device A operates in the second reception mode, and the wireless devices B, C, and D operate in the first reception. It is also assumed that the MAS 0 is a DRP slot that is reserved for the wireless device A to transmit a DRP traffic to the wireless device B, and the MAS 2 is a DRP slot that is reserved for the wireless device C to transmit the DRP traffic to the wireless device D. According to these assumptions, the MAS 1 and the MAS 3 are PCA slots.

Also, it is assumed that the wireless device B operating in the first reception mode has a PCA traffic to transmit to the wireless device C operating in the first reception mode. According to this assumption, during the BP, the wireless device B broadcasts the TIM IE containing the information indicating 'the wireless device B has a PCA traffic to transmit to the wireless device C' or transmits the TIM IE to the wireless device B.

The following table 4 shows active/inactive states of the wireless devices A, B, C, and D according to the above-described assumptions.

TABLE 4

|  | MAS 0 | MAS 1 | MAS 2 | MAS 3 |
|---|---|---|---|---|
| Device A ($2^{nd}$ reception mode) | Active | Active | Inactive | Active |
| Device B ($1^{st}$ reception mode) | Active | Active | Inactive | Active |
| Device C ($1^{st}$ reception mode) | Inactive | Active | Active | Active |
| Device D ($1^{st}$ reception mode) | Inactive | Inactive | Active | Inactive |

The wireless device A being in the second reception mode maintains an active state during the DRP slot that the wireless device A is reserved as a transmitter. The wireless device A is available to receive the PCA traffic regardless of whether the TIM IE is received. That is, the wireless device A maintains an active state during the MAS 1 and MAS 3 which are a PCA slot to be available to receive the PCA traffic. On the other hand, the wireless device maintains an inactive state during the MAS 2 which is a DRP slot that the wireless device is not reserved as transmitter nor a sender.

The wireless device B being in the first reception mode maintains an active state during the MAS 0 which is a DRP slot in which the wireless device is reserved as a receiver. Since the wireless device B has a PCA traffic to transmit to the wireless device C, the wireless device B maintains an active state during the MAS 1 and the MAS 3. On the other hand, the wireless device B maintains an inactive state during the MAS 2 which is a DRP slot in which the wireless device is not reserved as a transmitter or receiver.

The wireless device C being in the first reception mode maintains an active state during the MAS 2 which is a DRP slot in which the wireless device C is reserved as a transmitter. Since the wireless device B receives the TIM IE containing the information indicating 'the wireless device B has a PCA traffic to transmit to the wireless device C' during the BP, the wireless device C is available to receive the PCA traffic. That is, the wireless device C maintains an active state during the MAS 1 and the MAS 3 which are a PCA slot to be available to receive the PCA traffic. On the other hand, the wireless device C maintains an inactive state during the MAS 0 which is a DRP slot in which the wireless device C is not reserved as a transmitter or receiver.

The wireless device D being in the first reception mode maintains an active state during the MAS 2 which is a DRP slot in which the wireless device D is reserved as a receiver. Since the wireless device D does not receive the TIM IE containing the information indicating 'the wireless devices A, B and C have a PCA traffic to transmit to the wireless device B' during the BP, the wireless device D is unavailable to receive the PCA traffic. That is, the wireless device D maintains an inactive state during the MAS 1 and the MAS 3 which are a PCA slot to be unavailable to receive the PCA traffic. Also, the wireless device D maintains an inactive state during the MAS 0 which is a DRP slot in which the wireless device C is not reserved as a transmitter or receiver.

The wireless devices B and C maintain an active state during the MAS 1 and the MAS 3 which are a PCA slot so that the wireless device C is available to receive the PCA traffic from the wireless device B.

Since the wireless device D maintains an inactive state during the MAS 1 and MAS 3 which are a PCA slot in which the wireless device D has no PCA traffic to receive and thus is not required to maintain an active state, it can reduce a power consumption.

According to the present invention as described above, it is possible for a wireless device of a wireless network to inform another wireless device of its reception mode of PCA traffic reception and also to effectively transmit the PCA traffic to another wireless device by referring to the reception mode of PCA traffic of another wireless device. Also, the wireless device does not always maintain an active state during the PCA slot configuring the super frame. Only if there exist another wireless device to transmit the PCA traffic, the wireless device maintains an active state during the PCA slot, and otherwise, it maintains an inactive state during the PCA slot. Therefore, a power consumption can be reduced.

As described above, since the state of the sender node is identical to that of the receiver node, unnecessary power consumption can be prevented. That is, when the sender node remains in an active state, the receiver node remains in an active state too. Also, since the node determines its state by taking into consideration both its power sensitivity level and the power sensitivity level of its corresponding node, the power can be effectively used.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for informing a reception mode of a prioritized contention access (PCA) traffic of a wireless device of a wireless network, the method comprising:

the wireless device determining between one of a first reception mode and a second reception mode, in the first reception mode the wireless device being available or unavailable to receive the PCA traffic depending on a priority information received by the wireless device during a beacon period, in the second reception mode the wireless device being available to receive the PCA traffic regardless of the priority information received during the beacon period; and the wireless device broadcasting a reception mode information about the determined one of the first reception mode and the second reception mode over the network.

2. The method as claimed in claim 1, wherein in the first reception mode, the wireless device is available to receive the PCA traffic if the priority information includes an information indicating that 'another wireless device of the wireless network has a PCA traffic to transmit to the wireless device'.

3. The method as claimed in claim 2, wherein the priority information received by the wireless device during the beacon period includes a traffic indication map information element (TIM IE), and the information indicating that 'another wireless device has a PCA traffic to transmit to the wireless device' is recorded to the TIM IE.

4. The method as claimed in claim 3, wherein the priority information indicating that 'another wireless device has a PCA traffic to transmit to the wireless device' includes an address information about another wireless device which is a transmitter of the PCA traffic and an address information about the wireless device which is a receiver of the PCA traffic.

5. The method as claimed in claim 4, wherein in the second reception mode, the wireless device is available to receive the PCA traffic regardless of the content recorded to the TIM IE.

6. The method as claimed in claim 2, wherein in the first reception mode, if the priority information received by the wireless device during the beacon period includes the information indicating that 'another wireless device has a PCA traffic to transmit to the wireless device', the wireless device maintains an active state during a PCA slot in which another device is to transmit the PCA traffic, to be available to receive the PCA traffic, and if the priority information received by the wireless device during the beacon period does not include the information indicating that 'another wireless device has a PCA traffic to transmit to the wireless device', the wireless device maintains an inactive state during the PCA slot.

7. The method as claimed in claim 1, wherein the broadcasting step comprises:

the wireless device recording the reception mode information to a PCA availability IE that indicates a medium access slot (MAS) during which the wireless devices of the wireless network are available to receive the PCA traffic; and the wireless device broadcasting the PCA availability IE including the reception mode information over the network.

8. The method as claimed in claim 7, wherein the reception mode information is recorded to an interpretation field provided in the PCA availability IE.

9. The method as claimed in claim 8, wherein the interpretation field is 1 byte long, and the reception mode information is recorded to a TIM IE required bit provided in the interpretation field.

10. The method as claimed in claim 9, wherein if the TIM IE required bit is '1', the wireless device is in the first reception mode, and if the TIM IE required bit is '0', the wireless device is in the second reception mode.

11. The method as claimed in claim 1, wherein the determining step determines one of the first reception mode and the second reception mode based on at least one of a power level usable by the wireless device, an amount of traffic to be transmitted, an amount of traffic to be received, a transmission frequency and a reception frequency.

12. The method as claimed in claim 1, further comprising:
another wireless device receiving the reception mode information of the wireless device broadcasted by the wireless device; and
if the received state information indicates the first reception mode and another wireless device has a PCA traffic to transmit to the wireless device, another wireless device broadcasting the information indicating that 'another wireless device has a PCA traffic to transmit to the wireless device' before transmitting the PCA traffic.

13. A method for informing a reception mode of a prioritized contention access (PCA) traffic of a wireless device of a wireless network, the method comprising: the wireless device broadcasting a reception mode information indicating whether the wireless device is in a first reception mode or in a second reception mode, in the first reception mode the wireless device being available or unavailable to receive the PCA traffic depending on a priority information received by the wireless device during a beacon period, in the second reception mode, the wireless device being available to receive the PCA traffic regardless of the priority information received.

14. A method for informing an availability of reception of prioritized contention access (PCA) traffic of a wireless device which configures a wireless network using a contention based distributed medium access control, the method comprising:
the wireless device determining between one of a first reception mode and a second reception mode, in the first reception mode the wireless device being available or unavailable to receive the PCA traffic depending on a priority information received by the wireless device during a beacon period, in the second reception mode the wireless device being available to receive the PCA traffic regardless of the priority information received during the beacon period; and
the wireless device broadcasting a reception mode information about a determined one of the first reception mode and the second reception mode.

15. The method as claimed in claim 14, further comprising the wireless device referring to at least one of the determined reception mode and the priority information received by the wireless device during the beacon period, and maintaining one of an active state and an inactive state during specific slots.

16. A method for informing an availability of reception of prioritized contention access (PCA) traffic of a wireless device which configures a wireless network, the method comprising:
the wireless device broadcasting a reception mode information indicating whether the wireless device is in a first reception mode or in a second reception mode over the network, in the first reception mode the wireless device being available or unavailable to receive the PCA traffic depending on priority information received by the wireless device during a beacon period, in the second reception mode, the wireless device being available to receive the PCA traffic regardless of the priority information received during the beacon period.

17. The method as claimed in claim 16, wherein the wireless network uses a contention based distributed medium access control.

* * * * *